United States Patent
Nakano

(10) Patent No.: US 9,829,414 B2
(45) Date of Patent: Nov. 28, 2017

(54) FAULT DETECTION DEVICE AND FAULT DETECTION METHOD

(71) Applicant: HINO MOTORS, LTD., Tokyo (JP)

(72) Inventor: Hitoshi Nakano, Hino (JP)

(73) Assignee: Hino Motors, Ltd., Tokyo (JP)

( * ) Notice: Subject to any disclaimer, the term of this patent is extended or adjusted under 35 U.S.C. 154(b) by 221 days.

(21) Appl. No.: 14/432,275

(22) PCT Filed: Sep. 24, 2013

(86) PCT No.: PCT/JP2013/075652
§ 371 (c)(1),
(2) Date: Mar. 30, 2015

(87) PCT Pub. No.: WO2014/054453
PCT Pub. Date: Apr. 10, 2014

(65) Prior Publication Data
US 2015/0253221 A1    Sep. 10, 2015

(30) Foreign Application Priority Data

Oct. 5, 2012 (JP) ................................. 2012-223100

(51) Int. Cl.
*G01M 15/14* (2006.01)
*F02B 37/18* (2006.01)
(Continued)

(52) U.S. Cl.
CPC ............. *G01M 15/14* (2013.01); *F02B 37/16* (2013.01); *F02B 37/18* (2013.01); *F02B 39/16* (2013.01);
(Continued)

(58) Field of Classification Search
CPC ........ F02B 37/18; F02D 41/0007; G01F 1/86; G01M 15/14
See application file for complete search history.

(56) References Cited

U.S. PATENT DOCUMENTS

| 5,447,031 A | 9/1995 | Betts et al. |
| 5,502,966 A | 4/1996 | Unland et al. |
| 2010/0192546 A1* | 8/2010 | Nohl ..................... F01N 3/0256 60/286 |

FOREIGN PATENT DOCUMENTS

| DE | 102004036064 | 3/2006 |
| JP | 61-87928 A | 5/1986 |

(Continued)

OTHER PUBLICATIONS

Extended Search Report for European Patent Application No. 13844183.7, dated Jun. 29, 2016, 6 pages.
(Continued)

*Primary Examiner* — Hezron E Williams
*Assistant Examiner* — David Z Huang
(74) *Attorney, Agent, or Firm* — Sheridan Ross PC

(57) ABSTRACT

A fault detection device includes a wastegate valve, a control unit, a working gas amount computation section, and a determination section. The control unit obtains a rotational speed of an engine, a boost pressure, and an intake air temperature. The working gas amount computation section computes a computed value of a mass flow rate of working gas in the engine by using the rotational speed, the boost pressure, and the intake air temperature. The determination section determines that the wastegate valve has a fault when the computed value is not a normal value.

5 Claims, 3 Drawing Sheets

(51) Int. Cl.
  *F02B 39/16* (2006.01)
  *F02D 41/00* (2006.01)
  *F02D 41/22* (2006.01)
  *F02B 37/16* (2006.01)
  *G01F 1/86* (2006.01)
  *F02D 41/18* (2006.01)

(52) U.S. Cl.
  CPC ......... *F02D 41/0007* (2013.01); *F02D 41/18* (2013.01); *F02D 41/221* (2013.01); *G01F 1/86* (2013.01); *F02D 2200/0402* (2013.01); *F02D 2200/0406* (2013.01); *F02D 2200/0414* (2013.01); *Y02T 10/144* (2013.01); *Y02T 10/40* (2013.01)

(56) References Cited

FOREIGN PATENT DOCUMENTS

| | | |
|---|---|---|
| JP | 62-147026 A | 7/1987 |
| JP | 1-318728 A | 12/1989 |
| JP | 7-293302 A | 7/1995 |
| JP | 7-508331 A | 9/1995 |
| WO | WO 03/071111 | 8/2003 |

OTHER PUBLICATIONS

International Search Report prepared by the Japanese Patent Office dated Nov. 12, 2013, for International Application No. PCT/JP2013/075652.

International Preliminary Report on Patentability (with English translation) for International Application No. PCT/JP2013/075652, dated Apr. 7, 2015, 8 pages.

* cited by examiner

FAULT DETECTION DEVICE AND FAULT DETECTION METHOD

CROSS REFERENCE TO RELATED APPLICATIONS

This application is a national stage application under 35 U.S.C. 371 and claims the benefit of PCT Application No. PCT/JP2013/075652 having an international filing date of Sep. 24, 2013, which designated the United States, which PCT application claimed the benefit of Japanese Patent Application No. 2012-223100 filed Oct. 5, 2012, the disclosures of each of which are incorporated herein by reference.

TECHNICAL FIELD

The techniques of the present disclosure relate to a fault detection device and a fault detection method for a wastegate valve.

BACKGROUND ART

A conventionally known turbocharger includes a turbine, a wastegate passage that bypasses the turbine, and a wastegate valve arranged in the wastegate passage. The wastegate valve opens the wastegate passage to reduce exhaust gas flowing into the turbine when the pressure of the exhaust gas exceeds a predetermined value.

A known example of a technique for detecting a fault of a wastegate valve is determining whether a detection value of a boost pressure exceeds a limit and indicating a fault when the detection value exceeds the limit (e.g., refer to Patent Document 1).

PRIOR ART DOCUMENT

Patent Document

Patent Document 1: Japanese Laid-Open Patent Publication No. 7-293302

SUMMARY OF THE INVENTION

It is common that a boost pressure is detected as a different value even when a turbocharger is driven at the same rotational speed. Thus, to increase the accuracy of fault detection of a wastegate valve, there is still room for improvement in the aforementioned technique.

An object of the techniques of the present disclosure is to provide a fault detection device and a fault detection method that can detect a fault of a wastegate valve with great accuracy.

According to one aspect of the present invention to achieve the above objective, a fault detection device includes a wastegate valve, an acquisition section, a computation section, and a determination section. The acquisition section obtains a rotational speed of an engine, a boost pressure, and an intake air temperature. The computation section computes a computed value of a mass flow rate of working gas in the engine by using the rotational speed, the boost pressure, and the intake air temperature. The determination section determines that the wastegate valve has a fault when the computed value is not a normal value.

According to another aspect of the present invention to achieve the above objective, a fault detection method includes obtaining a rotational speed of an engine, a boost pressure, and an intake air temperature. The method includes computing a computed value of a mass flow rate of working gas by using the rotational speed, the boost pressure, and the intake air temperature. The method includes determining that a wastegate has a fault when the computed value is not a normal value.

According to these configurations, a mass flow rate of working gas is computed by using a boost pressure, an intake air temperature, and a rotational speed of the engine. A fault of the wastegate valve is determined based on the computed value. In other words, for detecting the fault of the wastegate valve, the intake air temperature is taken into account in addition to the boost pressure so that the fault of the wastegate valve is detected under the condition according to an ambient temperature. As a result, the fault of the wastegate valve is detected with great accuracy.

Preferably, the determination section uses data having the normal value that is set in accordance with an operation condition of the engine and determines that the wastegate valve has a fault when the computed value is not the normal value according to the operation condition.

According to this configuration, a fault of the wastegate valve is detected under the standard according to the operation condition of the engine. As a result, the fault of the wastegate valve is detected with great accuracy.

Preferably, the acquisition section obtains information indicating a control state of the wastegate valve. The determination section uses data having the normal value that is set for each control state in accordance with the operation condition and determines that the wastegate valve has a fault when the computed value is not the normal value, which is set in accordance with the operation condition.

According to this configuration, a fault is detected according to a control state of the wastegate valve, i.e., whether the wastegate valve is open or closed. Thus, the fault of the wastegate valve is detected with further great accuracy.

Preferably, the acquisition section obtains the rotational speed, the boost pressure, and the intake air temperature when a predetermined period has elapsed after the wastegate valve is switched between an open state and a closed state.

For example, even if the wastegate valve is switched from the closed state to the open state, rotation of the turbine affects the mass flow rate of working gas for a period of the inertial rotation of the turbine. In the period, the computed value of the working gas tends to be large. For this reason, if a fault is detected within a predetermined time after the wastegate valve is switched from the closed state to the open state under the same condition as in another period when the wastegate valve is in the open state, the wastegate valve is likely determined as having a fault. According to the configuration, fault detection is interrupted for the predetermined time after the wastegate valve is switched between the open state and the closed state. In other words, a fault is determined while the rotation of the turbine is stable compared to the rotation of the turbine immediately after the wastegate valve is switched between the open state and the closed state. Thus, a fault of the wastegate valve is detected with further great accuracy.

DETAILED DESCRIPTION OF THE PREFERRED EMOBIDMENTS

A fault detection device and a fault detection method according to one embodiment of the present invention will now be described with reference to FIGS. 1 to 3. First, the general structure of a diesel engine provided with a fault detection device will be described with reference to FIG. 1.

Figure 1:
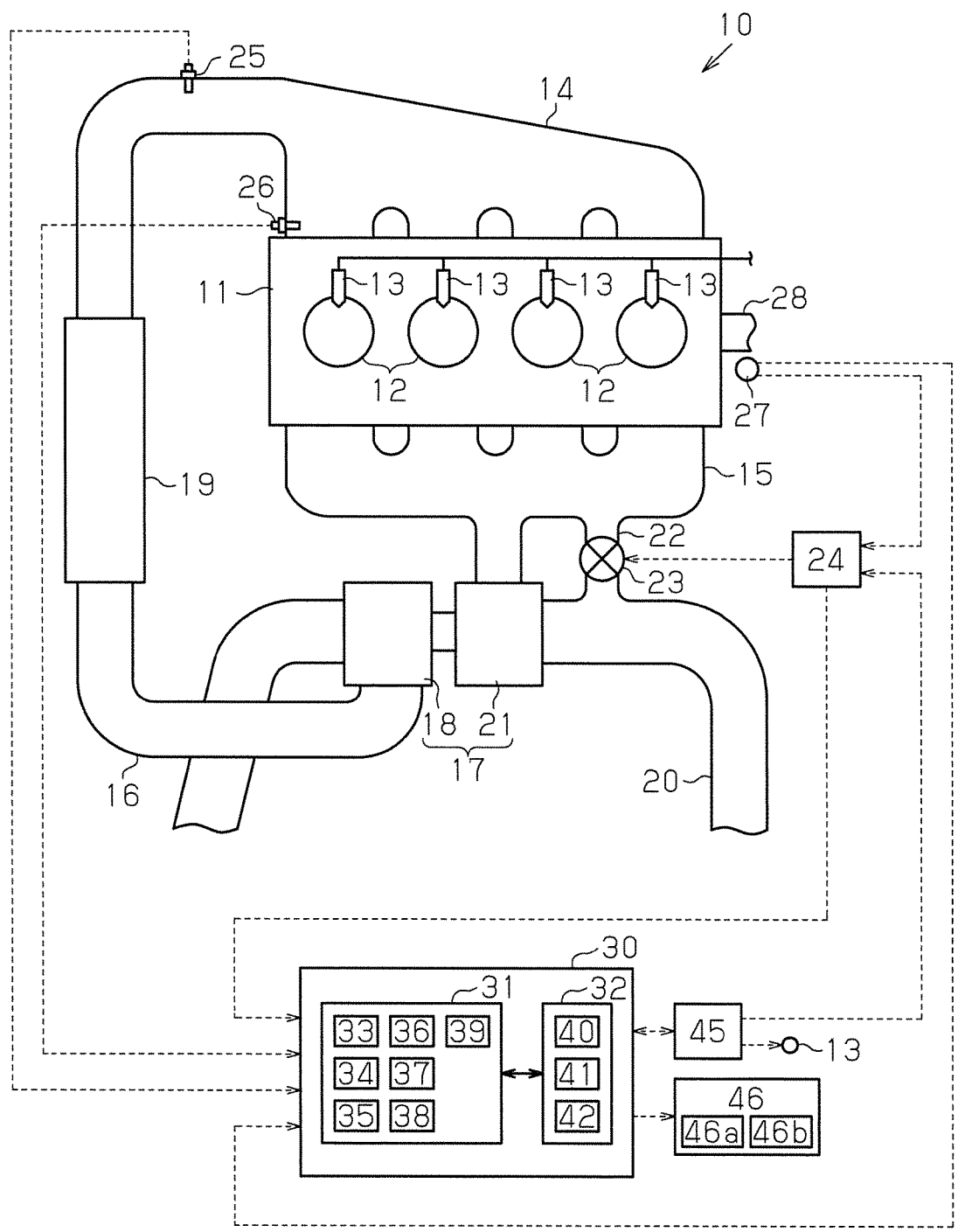
FIG. 1 is a schematic view showing a fault detection device according to one embodiment of the present invention, with a schematic view of an engine provided with the fault detection device.

As shown in FIG. 1, a diesel engine 10 (hereinafter, referred to simply as an engine 10) has a cylinder block 11 including in-line four cylinders 12. Each of the cylinders 12 receives injection of fuel from a corresponding injector 13. The cylinder block 11 is connected to an intake manifold 14, which supplies intake air, which is working gas, to the cylinders 12, and an exhaust manifold 15, into which exhaust gas flows from the cylinders 12.

The intake manifold 14 is connected to the upstream end of an intake passage 16, to which an air cleaner (not shown) is attached. A compressor 18 of a turbocharger 17 is attached to the intake passage 16. An intercooler 19 that cools intake air compressed by the compressor 18 is attached to a portion of the intake passage 16, which is located downstream of the compressor 18.

The exhaust manifold 15 is connected to an exhaust passage 20. A turbine 21 is attached to the exhaust passage 20 and coupled to the compressor 18. The exhaust manifold 15 and the exhaust passage 20 are connected to a wastegate passage 22 (hereinafter, referred to as a W/G (Waste Gate) passage 22), which bypasses the turbine 21.

A wastegate valve 23 (hereinafter, referred to as a W/G valve 23) is attached to the W/G passage 22 and opens or closes the W/G passage 22. A wastegate valve control section (hereinafter, referred to as a W/G valve control section 24) controls opening or closing of the W/G valve 23. The W/G valve control section 24 switches the W/G valve 23 between an open state and a closed state according to the rotational speed NE of the engine 10 and a fuel injection amount Qf. When the W/G valve 23 is in a closed state, exhaust gas in the exhaust manifold 15 flows into the turbine 21. When the W/G valve 23 is in an open state, the exhaust gas in the exhaust manifold 15 bypasses the turbine 21 to flow into the exhaust passage 20.

Various sensors are attached to the engine 10 and obtain information of the operation condition of the engine 10. For example, a boost pressure sensor 25 is attached to a portion of the intake passage 16 that is located downstream of the compressor 18. The boost pressure sensor 25 senses a boost pressure Pb at predetermined control intervals. The boost pressure Pb is the pressure of working gas that is compressed by the compressor 18 and flows in the intake passage 16. An intake air temperature sensor 26 is attached to the intake manifold 14. The intake air temperature sensor 26 senses an intake air temperature Tin at predetermined control intervals. The intake air temperature Tin is the temperature of working gas immediately before flowing into the cylinders 12. The engine 10 is provided with a rotational speed detector 27, which detects the rotational speed NE of the engine 10. The rotational speed detector 27 detects the rotational speed of a crankshaft 28 to detect the rotational speed NE of the engine 10 at predetermined control intervals.

A fault detection device 30, which detects a fault of the aforementioned W/G valve 23, will now be described with reference to FIGS. 1 to 3. First, the electrical configuration of the fault detection device 30 will be described with reference to FIG. 1.

As shown in FIG. 1, the fault detection device 30 consists of a CPU, ROM, RAM, and the like and includes a control unit 31 for performing various computation and various settings and a memory 32 for storing various control programs and various data. The control unit 31 executes a fault detection process of detecting a fault of the W/G valve 23 based on the various control programs and the various data stored in the memory 32.

The fault detection device 30 receives inputs of a detection signal indicating the boost pressure Pb from the boost pressure sensor 25, a detection signal indicating the intake air temperature Tin from the intake air temperature sensor 26, and a detection signal indicating the rotational speed NE of the engine 10 from the rotational speed detector 27 at predetermined control intervals. The fault detection device 30 also receives input of a control signal indicating the control state of the W/G valve 23, i.e., whether the W/G valve 23 is open or closed, from the W/G valve control section 24, which controls opening and closing of the W/G valve 23, at predetermined control intervals. The fault detection device 30 also receives input of a signal indicating the fuel injection amount Qf from a fuel injection control section 45 at predetermined intervals. The fuel injection control section 45 controls the fuel injection amount Qf, which is an amount of fuel injected by the injectors 13. The control unit 31 serves as an acquisition section and obtains the various information.

The control unit 31 has an open/closed flag setting section 33 that sets an open/closed flag F1, which indicates whether a wastegate valve is open or closed. When the W/G valve control section 24 inputs a control signal indicating that the W/G valve 23 is in the open state, the open/closed flag setting section 33 sets the open/closed flag F1 to 0. When the W/G valve control section 24 inputs a control signal indicating that the W/G valve 23 is in the closed state, the open/closed flag setting section 33 sets the open/closed flag F1 to 1.

The control unit 31 has a clock section 34 that measures a time period that has elapsed after the W/G valve 23 is switched between the open state and the closed state. The clock section 34 sets a count value C of a counter (not shown) to an initial value Ci when a control signal from the W/G valve control section 24 is changed and counts down the count value C at predetermined intervals. The control unit 31 continues the fault detection process of the W/G valve 23 when the count value C becomes 0. When the W/G valve 23 is switched between the open state and the closed state, there is a transitional period immediately after the switching, which is a period for the turbine 21 to change the rotation to the rotation according to whether the W/G valve 23 is open or closed after the switching. The initial value Ci is a value for determining whether the transitional period has elapsed.

The control unit 31 has a working gas amount computation section 35 that computes a working gas amount, which is a mass flow rate of working gas supplied to the cylinders 12. In the present embodiment, the working gas is intake air. The working gas amount computation section 35 computes a computed value Gc of the working gas amount by substituting the following values in the conditional equation, $P \times V = Gc \times R \times T$. The working gas amount computation section 35 functions as a computation section for computing the computed value Gc.

P: the boost pressure Pb, which is a detection value by the boost pressure sensor 25

V: a product of the rotational speed NE of the engine 10 and an exhaust amount D of the engine 10

T: the intake air temperature Tin, which is a detection value by the intake air temperature sensor 26

R: the gas constant

The control unit 31 has a reference value computation section 36 that computes a reference value Gs, which is an ideal amount of working gas according to the operation condition of the engine 10, including whether the W/G valve 23 is open or closed. The reference value computation section 36 computes the reference value Gs of the working gas amount based on the rotational speed NE of the engine 10, the fuel injection amount Qf, and reference data 40 stored in the memory 32.

The reference data 40 is data created based on experiment results performed in advance for the engine 10 and having a corresponding reference value Gs provided according to the rotational speed NE of the engine 10 and the fuel injection amount Qf. The reference value computation section 36 selects a value from the reference data 40 according to the rotational speed NE of the engine 10 and the fuel injection amount Qf to compute the reference value Gs.

The control unit 31 has a threshold setting section 37 that sets a threshold Gt for a determination value Gj, which is the absolute value of a value obtained by subtracting the reference value Gs from the computed value Gc of the working gas amount. The threshold setting section 37 sets the threshold Gt based on the open/closed flag F1, the rotational speed NE of the engine 10, the fuel injection amount Qf, and first threshold data 41 and second threshold data 42 stored in the memory 32. The first threshold data 41 has the threshold Gt when the W/G valve 23 is controlled in the closed state, and the threshold Gt is set in accordance with the rotational speed NE and the fuel injection amount Qf. The second threshold data 42 has the threshold Gt when the W/G valve 23 is controlled in the open state, and the threshold Gt is set in accordance with the rotational speed NE and the fuel injection amount Qf.

The threshold Gt of each data 41 and 42 is a value provided based on experiment or simulation results performed in advance for the engine 10, and the thermal influences to the W/G valve 23 and the W/G passage 22 are taken into account in the value. The threshold setting section 37 selects the first threshold data 41 or the second threshold data 42 according to the value of the open/closed flag F1 and selects a threshold Gt from the selected threshold data according to the rotational speed NE and the fuel injection amount Qf to set the threshold Gt.

The control unit 31 has a determination section 38 that determines whether a fault has occurred in the W/G valve 23. The determination section 38 computes the aforementioned determination value Gj and determines whether the determination value Gj is greater than or equal to the threshold Gt. The determination section 38 determines that a fault has occurred in the W/G valve 23 when the determination value Gj exceeds the threshold Gt. In other words, determination of whether the determination value Gj exceeds the threshold Gt corresponds to determination of whether the computed value Gc is a normal value (the reference value Gs). When the open/closed flag F1=0, the determination section 38 determines that the W/G valve 23 is in a first fault state, in which the W/G valve 23 is fixed in the open state. When the open/closed flag F1=1, the determination section 38 determines that the W/G valve 23 is in a second fault state, in which the W/G valve 23 is fixed in the closed state. When the determination value Gj is less than or equal to the threshold Gt, the determination section 38 determines that the W/G valve 23 operates normally.

The control unit 31 has a fault flag setting section 39. When the determination section 38 determines the state of the W/G valve 23, the fault flag setting section 39 sets a fault flag F2 according to the determination result. The fault flag setting section 39 sets the fault flag F2 to 0 when it is determined that the W/G valve 23 is in a normal state. The fault flag setting section 39 sets the fault flag F2 to 1 when it is determined that the W/G valve 23 is in the first fault state. The fault flag setting section 39 sets the fault flag F2 to 2 when it is determined that the W/G valve 23 is in the second fault state.

When the fault flag F2 is set at 1, the control unit 31 outputs a control signal indicating that the W/G valve 23 is in the first fault state to an alarm device 46. When receiving input of the control signal, the alarm device 46 lights an alarm lamp 46a, which indicates that the W/G valve 23 is in the first fault state, to notify a driver that the W/G valve 23 is in the first fault state.

When the fault flag F2 is set at 2, the control unit 31 outputs a control signal indicating that the W/G valve 23 is in the second fault state to the alarm device 46. When receiving input of the control signal, the alarm device 46 lights an alarm lamp 46b, which indicates that the W/G valve 23 is in the second fault state, to notify the driver that the W/G valve 23 is in the second fault state.

When the fault flag F2 is set at 1 or 2, the control unit 31 outputs an output limitation signal that indicates limiting the fuel injection amount Qf to the fuel injection control section 45. When receiving input of the output limitation signal, the fuel injection control section 45 reduces the fuel injection amount Qf calculated according to the operation condition of the engine 10 at a predetermined ratio and controls the injector 13 to inject the reduced fuel injection amount Qf of fuel into the cylinders 12.

After completing maintenance of the fault of the W/G valve 23, an operator who has performed the maintenance sets the fault flag F2 to 0. The operator resets the lit alarm lamps 46a and 46b of the alarm device 46 and the output limitation by the fuel injection control section 45.

The steps of the fault detection process executed by the fault detection device 30 will now be described with reference to FIG. 2. The fault detection process is repeatedly executed. As a process separated from the fault detection process described below, the control unit 31 performs setting and counting down of the count value C with the clock section 34.

Figure 2:
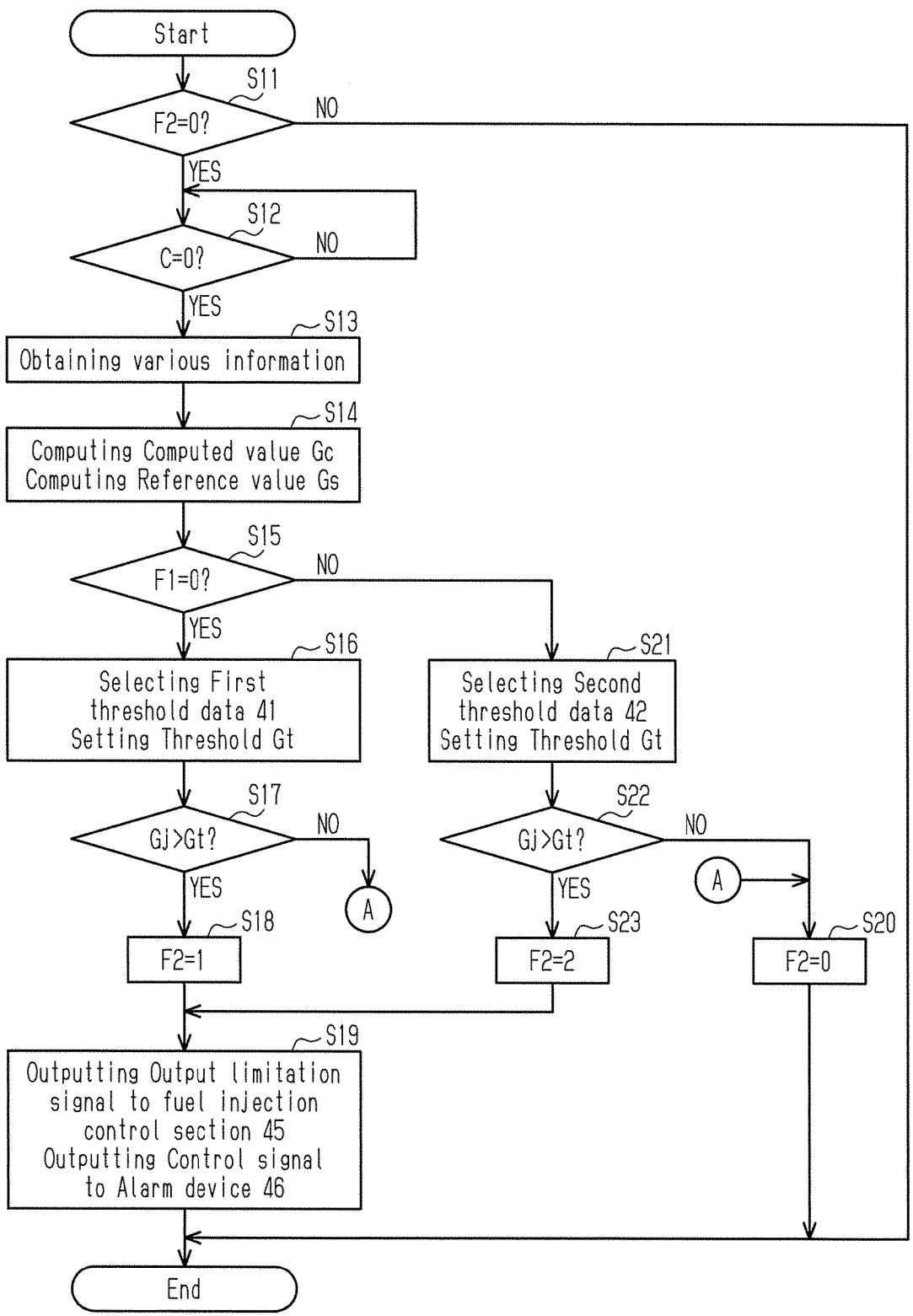
FIG. 2 is a flowchart showing steps of a fault detection process.

As shown in FIG. 2, when the fault detection process is started, the control unit 31 at the first step S11 determines whether the fault flag F2 is 0, i.e., whether the W/G valve 23 operates normally. When the fault flag F2 is 1 (step S11: NO), i.e., when a fault is already detected in the W/G valve 23, the control unit 31 finishes the fault detection process.

When the fault flag F2 is 0 (step S11: YES), the control unit 31 at the next step S12 repeatedly determines whether the count value C of the clock section 34 is 0. In other words, the control unit 31 at step S12 determines whether the transitional period has elapsed after the control signal from the W/G valve control section 24 is changed.

When the count value C of the clock section 34 is 0 (step S12: YES), the control unit 31 at the next step S13 obtains various information, which is the fuel injection amount Qf, the boost pressure Pb, the rotational speed NE of the engine 10, and the intake air temperature Tin. In other words, the control unit 31 as an acquisition section obtains the rotational speed NE, the boost pressure Pb, and the intake air temperature Tin when a predetermined time has elapsed after the W/G valve 23 is switched between the open state and the closed state.

At the next step S14, the control unit 31 computes the computed value Gc of the working gas amount based on the boost pressure Pb, the rotational speed NE, and the intake air temperature Tin obtained at step S13. The control unit 31 also computes the reference value Gs of the working gas amount based on the fuel injection amount Qf and the rotational speed NE obtained at step S13 and the reference data 40 stored in the memory 32.

At the next step S15, the control unit 31 determines whether the open/closed flag F1 is 0. In other words, the control unit 31 at step S15 determines whether the W/G valve 23 is controlled in the closed state.

When the open/closed flag F1 is 0 (step S15: YES), the control unit 31 at the next step S16 selects the first threshold data 41 as a threshold data for setting the threshold Gt. The control unit 31 also selects a value from the first threshold data 41 according to the fuel injection amount Qf and the rotational speed NE obtained at step S13, and sets the selected value as the threshold Gt. The control unit 31 at the next step S17 then determines whether the determination value Gj, which is the difference between the computed value Gc and the reference value Gs, exceeds the threshold Gt set at step S16.

When the determination value Gj exceeds the threshold Gt (step S17: YES), the control unit 31 at the next step S18 determines that the W/G valve 23 is in the first fault state, in which the W/G valve 23 is fixed in the open state, and sets the fault flag F2 to 1.

At the next step S19, the control unit 31 outputs an output limitation signal that indicates limiting the fuel injection amount Qf to the fuel injection control section 45. The control unit 31 then outputs a control signal indicating that the W/G valve 23 is in the first fault state to the alarm device 46 and finishes a sequence of steps. When receiving input of the output limitation signal, the fuel injection control section 45 limits the fuel injection amount Qf. When receiving input of the control signal, the alarm device 46 lights the alarm lamp 46a to notify the driver that the W/G valve 23 is in the first fault state.

In contrast, when the determination value Gj is less than or equal to the threshold Gt (step S17: NO), the control unit 31 at the next step S20 determines that the W/G valve 23 operates normally, sets the fault flag F2 to 0, and finishes the sequence of steps.

When the open/closed flag F1 at step S15 is 1 (step S15: NO), the control unit 31 at the next step S21 selects the second threshold data 42 as threshold data for setting the threshold Gt. The control unit 31 also selects a value from the second threshold data 42 according to the fuel injection amount Qf and the rotational speed NE obtained at step S13, and sets the selected value as the threshold Gt. The control unit 31 at the next step S22 then determines whether the determination value Gj exceeds the threshold Gt set at step S21.

When the determination value Gj exceeds the threshold Gt (step S22: YES), the control unit 31 at the next step S23 determines that the W/G valve 23 is in the second fault state, in which the W/G valve 23 is fixed in the closed state, and sets the fault flag F2 to 2.

When the fault flag F2 is set at 2, the control unit 31 moves to step S19 and outputs an output limitation signal that indicates limiting the fuel injection amount Qf to the fuel injection control section 45. The control unit 31 then outputs a control signal indicating that the W/G valve 23 is in the second fault state to the alarm device 46 and finishes the sequence of steps. When receiving input of the output limitation signal, the fuel injection control section 45 limits the fuel injection amount Qf. When receiving input of the control signal, the alarm device 46 lights the alarm lamp 46b to notify the driver that the W/G valve 23 is in the second fault state.

In contrast, when the determination value Gj is less than or equal to the threshold Gt (step S22: NO), the control unit 31 moves to step S20, sets the fault flag F2 to 0, and finishes the sequence of steps.

Operation of the aforementioned fault detection device 30 will now be described with reference to FIG. 3.

The density of intake air changes depending on the environment such as ambient pressure and an ambient temperature. Thus, the mass flow rate varies even at the same volume flow rate. For this reason, even if intake air at the same volume flow rate is compressed by the compressor 18 with the same rotational speed, the boost pressure Pb, which is pressure after the compression, and the intake air temperature Tin, which is a temperature after the compression, vary depending on the environment.

In this regard, the aforementioned fault detection device 30 computes the working gas amount based on the boost pressure Pb, the intake air temperature Tin, and the rotational speed NE of the engine 10, and detects a fault of the W/G valve 23 based on the computed value Gc. In other words, a fault of the W/G valve 23 is detected with the intake air temperature Tin in addition to the boost pressure Pb so that the intake air temperature Tin, i.e., an ambient temperature, is taken into account for the detection. As a result, compared to when a fault of the W/G valve 23 is detected only with the boost pressure Pb, the fault of the W/G valve 23 is detected with great accuracy.

For example, when the temperature of exhaust gas rises due to the large fuel injection amount Qf with the W/G valve 23 in the closed state, the thermally expanded W/G passage 22 and W/G valve 23 change a clearance between the W/G passage 22 and the W/G valve 23. The change in the clearance changes a leak amount of exhaust gas in the W/G passage 22. Similarly, even with the W/G valve 23 in the open state, the thermally expanded W/G passage 22 changes the flow path cross-sectional area of the W/G passage 22, thereby changing the circulation amount of exhaust gas in the W/G passage 22.

In this regard, the aforementioned fault detection device 30 selects the first threshold data 41 or the second threshold data 42 according to whether the W/G valve 23 is open or closed, and sets the threshold Gt provided in the selected threshold data as the threshold. The first threshold data 41 and the second threshold data 42 provide the threshold Gt according to the rotational speed NE and the fuel injection amount Qf, i.e., the threshold Gt taking account of the thermal expansion of the W/G valve 23 and the W/G passage 22 according to the operation condition of the engine 10. In other words, the fault detection device 30 sets the threshold Gt while the open or closed state of the W/G valve 23, the thermal influence to the W/G valve 23, and the thermal influence to the W/G passage 22 are taken into account. As a result, a fault of the W/G valve 23 is detected with further great accuracy.

Figure 3A:
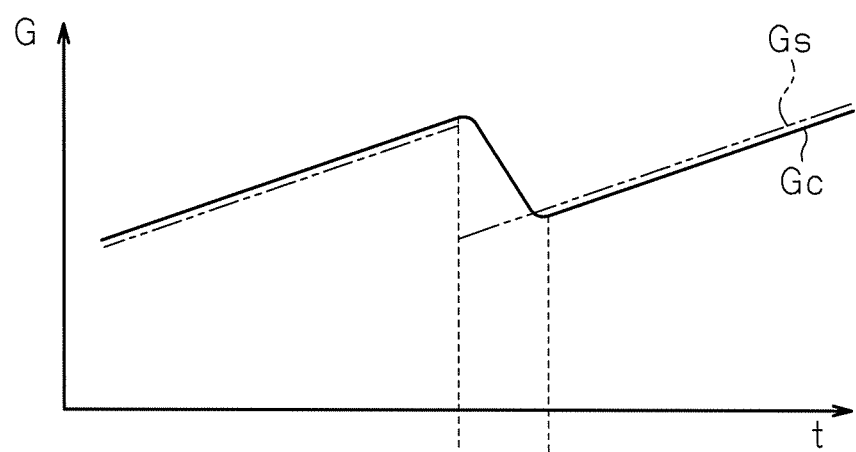
FIG. 3 is a graph in which (a) shows an example of the changes in a reference value and a computed value of a working gas amount before and after a wastegate valve is switched from a closed state to an open state, and (b) shows whether the wastegate valve is open or closed.
Figure 3B:
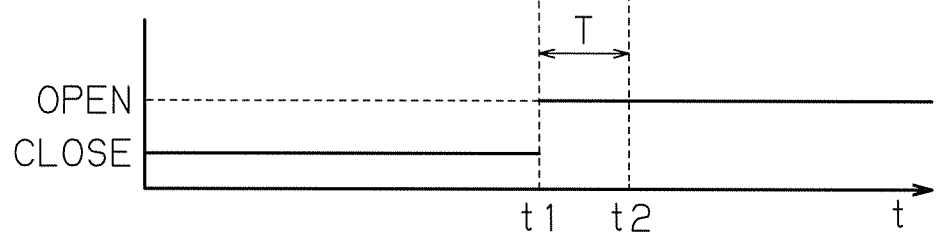

As shown in FIG. 3, when the rotational speed NE and the fuel injection amount Qf are increased as time elapses, the W/G valve 23 is switched from the closed state to the open state at time t1. Since a time period T between the time t1 and time t2 is a transitional period for which the turbine 21 has rotational inertia, the computed value Gc of working gas gradually decreases during the time period T. For this reason, the determination value Gj in the time period T is likely to be greater than the determination value Gj at time after the time t2. Thus, the W/G valve 23 is likely determined as having a fault.

Similarly, when the rotational speed NE and the fuel injection amount Qf are decreased as time elapses, the W/G valve 23 is switched from the open state to the closed state. A time period immediately after the switching is a transitional period for which the rotational speed of the turbine 21 that was stopped gradually increases. Thus, the computed value Gc of the working gas amount gradually increases during the period. For this reason, the determination value Gj in the period is also likely to increase, and the W/G valve 23 is likely determined as having a fault.

In this regard, when the W/G valve 23 is switched between the open state and the closed state, the aforementioned fault detection device 30 interrupts fault detection of the W/G valve 23 without obtaining various information until the count value C of the clock section 34 changes from an initial value Ci to 0, i.e., until the transitional period elapses. This avoids erroneous detection of a fault due to the transitional period.

In the first fault state, in which the W/G valve 23 is fixed in the open state, oxygen is likely to be insufficient relative to the fuel injection amount Qf because a sufficient boost pressure cannot be obtained. Thus, it is a concern that non-burnt fuel contained in exhaust gas will increase so that the fuel efficiency is worsened. In the second fault state, in which the W/G valve 23 is fixed in the closed state, the exhaust pressure and the exhaust temperature in the exhaust manifold 15 are excessively increased, and the turbine 21 overruns.

In this regard, the aforementioned fault detection device 30 outputs an output limitation signal to the fuel injection control section 45 that limits the fuel injection amount Qf when a fault is detected in the W/G valve 23. For this reason, non-burnt fuel contained in exhaust gas is reduced in the first fault state, and overrunning of the turbine 21 is avoided in the second fault state. In other words, failure caused by a fault of the W/G valve 23 is avoided by limiting the fuel injection amount Qf.

For example, when an air hose constituting the intake passage 16 is cracked, the first fault state is possibly determined even when the W/G valve 23 is not fixed in the open state. In this regard, the aforementioned fault detection device 30 detects a fault state by distinguishing between the first fault state, in which the W/G valve 23 is fixed in the open state, and the second fault state, in which the W/G valve 23 is fixed in the closed state. For this reason, it is easier to find out what causing the fault state by distinguishing the fault state of the W/G valve 23 when the fault state is determined in spite of the W/G valve 23 operating normally.

As described above, the fault detection device 30 and the fault detection method according to the above embodiment have the following advantages.

(1) A fault of the W/G valve 23 is detected while taking account of the intake air temperature Tin in addition to the boost pressure Pb. Thus, the fault of the W/G valve 23 is detected with great accuracy.

(2) The threshold Gt is set while taking account of whether the W/G valve 23 is open or closed, the thermal influence to the W/G valve 23, and the thermal influence to the W/G passage 22. Thus, a fault of the W/G valve 23 is detected with further great accuracy.

(3) Fault detection of the W/G valve 23 is interrupted until the transitional period elapses. Thus, erroneous detection of a fault due to the transitional period is avoidable.

(4) Failure caused by a fault of the W/G valve 23 is avoidable by limiting the fuel injection amount Qf.

(5) Distinction of a fault state between the first fault state and the second fault state makes it easier to find out the cause of a fault state when the fault state is determined in spite of the W/G valve 23 operating normally.

The above embodiment is modified in the following forms.

The fault detection device 30 does not necessarily need to output an output limitation signal to the fuel injection control section 45 when a fault is detected in the W/G valve 23. In other words, even after the fault is detected in the W/G valve 23, the fuel injection amount Qf does not necessarily need to be limited.

The fault detection device 30 may also detect a fault of the W/G valve 23 in the transitional period. In the configuration, it is preferable to store a third threshold data for providing a threshold in the transitional period in the memory 32 and set a threshold in the transitional period based on a third threshold data.

The threshold Gt may have a constant value regardless of whether the W/G valve 23 is open or closed.

The threshold Gt provided by the first threshold data 41 may be any value as long as the threshold Gt is set in accordance with the operation condition of the engine 10. For example, the value may have a pattern of decreasing as the fuel injection amount Qf decreases. The threshold Gt provided by the first threshold data 41 may have a constant value regardless of the operation condition of the engine 10. Similarly, the second threshold data 42 may be a value according to the operation condition of the engine 10 or may be a constant value regardless of the operation condition of the engine 10.

The fault detection device 30 may have a range of working gas amounts in which a fault of the W/G valve 23 is determined and which is according to the fuel injection amount Qf and the rotational speed NE. Data for providing the range is stored in the memory 32, and a fault is detected based on the data and the computed value Gc of a working gas amount. In other words, the fault detection device 30 may detect a fault of the W/G valve 23 without computing the determination value Gj but with the computed value Gc of the working gas amount.

A fault of the W/G valve 23 may be detected without distinguishing the fault state between the first fault state and the second fault state. When detecting a fault of the W/G valve 23, only the first fault state may be detected, or only the second fault state may be detected.

An EGR passage may be provided for the engine 10 to circulate some of the exhaust gas through the intake passage 16. In other words, working gas may be mixture of intake air and exhaust gas. In this case, it is preferable to compute the working gas while taking account of the pressure of the EGR passage, an EGR amount, and the like.

The fault detection device 30 may be one electronic control unit, or may consist of a plurality of electronic control units. The fault detection device 30, the fuel injection control section 45, and the W/G valve control section 24 may be included in one electronic control unit, or may be included in a plurality of electronic control units.

The engine provided with the fault detection device 30 may be a gasoline engine.

The invention claimed is:

1. A fault detection system comprising:
a wastegate valve;
an acquisition section in communication with a rotational speed detector, a pressure sensor, and a temperature sensor;
the acquisition section operable to receive information related to a rotational speed of an engine, a boost pressure, an intake air temperature, and information indicating a control state of a wastegate valve;
a computation section operable to compute a mass flow rate of working gas in the system by using the information related to the rotational speed, the boost pressure, and the intake air temperature; and
a determination section that comprises data having a normal value that is set for each control state of the wastegate valve in accordance with an operation condition of the system and is operable to determine that the wastegate valve has a fault when the computed value is not the normal value, wherein the normal value is set in accordance with the control state of the wastegate valve and the operation condition of the system.

2. The fault detection system according to claim 1, wherein
the determination section uses reference data to determine whether the computed value is the normal value, and
the reference data has the normal value that is set in accordance with the operation condition of the system.

3. The fault detection system according to claim 2, wherein
the acquisition section obtains information indicating the control state of the wastegate valve,
the determination section uses threshold data to determine whether the computed value is the normal value, and
the threshold data has a threshold that is set for each control state in accordance with the operation condition.

4. The fault detection system according to claim 1, wherein
the acquisition section obtains the rotational speed, the boost pressure, and the intake air temperature when a predetermined period has elapsed after the wastegate valve is switched between an open state and a closed state.

5. A fault detection method comprising:
obtaining a rotational speed of an engine from a rotational speed detector, a boost pressure from a pressure sensor, an intake air temperature from a temperature sensor, and information indicating a control state of a wastegate valve from a valve control section;
in a control unit, computing a mass flow rate of working gas in the engine by using the rotational speed, the boost pressure, and the intake air temperature; and
in the control unit, providing data comprising a normal value that is set for each control state of the wastegate valve in accordance with an operation condition of the engine and determining that the wastegate valve has a fault when the computed value is not the normal value, which is set in accordance with the control state of the wastegate valve and the operation condition of the engine, and wherein the control unit outputs a signal to at least one of a fuel injection control unit, an alarm device, and the valve control section when the computed value is not the normal value.

* * * * *